Dec. 27, 1938.  G. A. LYON  2,141,719
METHOD FOR MAKING BUMPERS
Filed Nov. 5, 1936
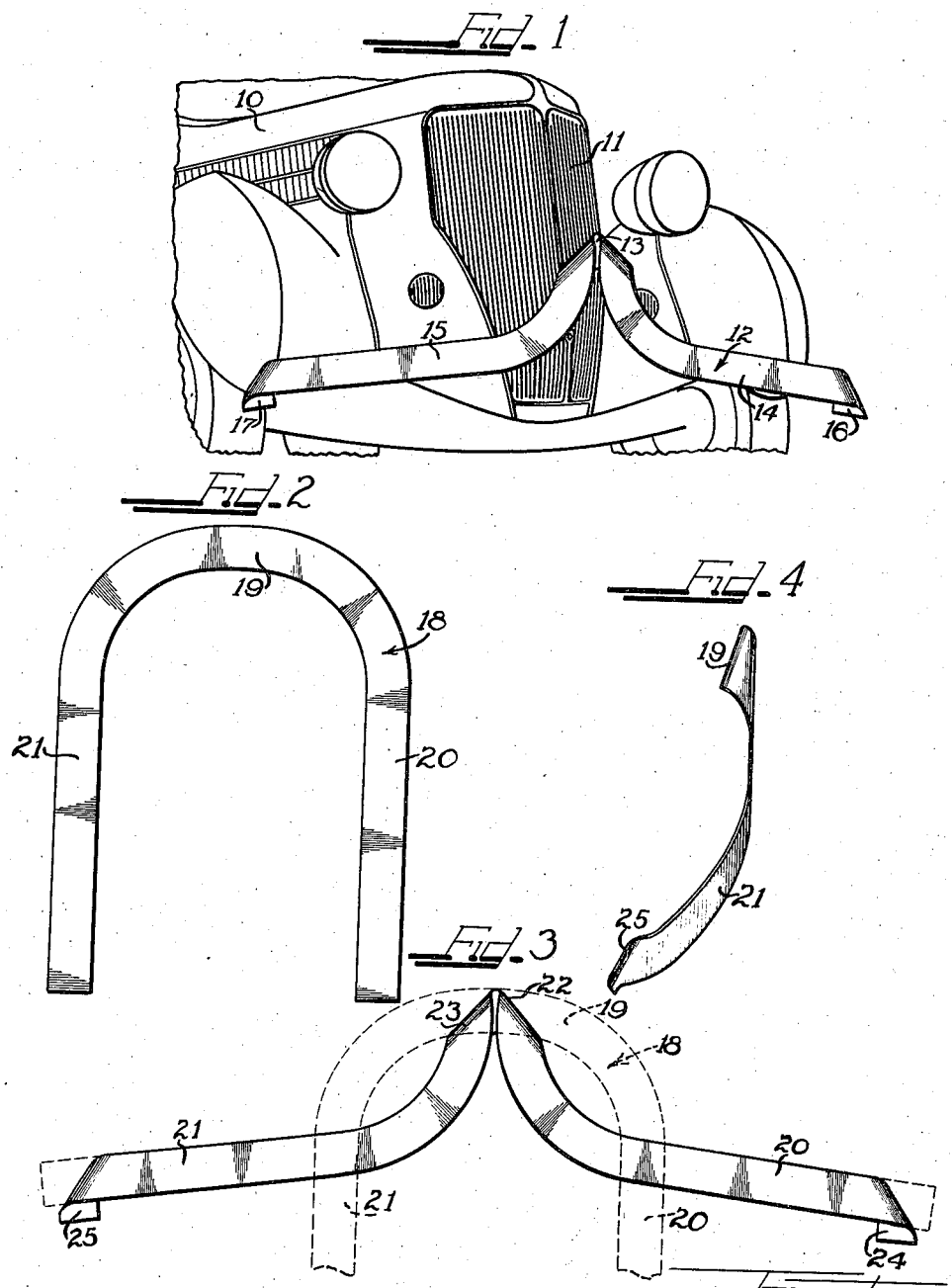
GEORGE ALBERT LYON Patented Dec. 27, 1938

2,141,719

UNITED STATES PATENT OFFICE 2,141,719

METHOD FOR MAKING BUMPERS

George Albert Lyon, Allenhurst, N. J.

Application November 5, 1936, Serial No. 109,250

11 Claims. (Cl. 29—152)

This invention relates to vehicle bumpers, and more particularly to a novel method of forming vehicle bumpers of a type adapted to protect the radiator grille of an automotive vehicle.

Following the wide spread adoption of cast grilles for automotive vehicles, a new problem arose in the design and manufacture of vehicle bumpers. Cast grilles, while highly pleasing to the eye, are extremely brittle, and hence are frequently broken by minor collisions. It therefore became desirable to provide a bumper so shaped as to afford a substantial degree of protection for the radiator grilles of automotive vehicles.

It is an object of this invention to provide a novel method of making bumpers having the above highly desirable characteristics.

It is a further object of this invention to provide a novel method of forming a vehicle bumper having a central portion thereof extending upwardly at a sharp angle.

It is a still further object of this invention to provide a novel method for making a vehicle bumper similar in shape to the central portion of an inverted double cycloid.

Another object of this invention is to provide a novel method of making a vehicle bumper from a single U-shaped strip of material.

Another and further object of this invention is to provide a novel method of making a vehicle bumper from a U-shaped strip of material including a double bend at the central portion of the strip and a single bend at the extremity of the strip.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawing in which:

Figure 1 is a perspective view of an automotive vehicle having a bumper thereon constructed in accordance with the teachings of this inventon;

Figure 2 illustrates a U-shaped strip of bumper material formed according to the first step of the method;

Figure 3 illustrates the U-shaped strip of material after it has been bent to form a vehicle bumper; and Figure 4 is an end view of the bumper shown in Figure 3.

Referring now to Figure 1 of the drawing, an automotive vehicle 10 having the usual radiator grille 11 is shown as equipped with a vehicle bumper 12 secured to the vehicle in any suitable manner (not shown). Bumper 12 includes a central portion 13 and two oppositely extending arms 14 and 15 which terminate in downwardly extending end portions 16 and 17 respectively. The shape of bumper 12 in general is similar to the central portion of an inverted double cycloid. As will readily be understood from a cursory inspection of the drawing, central portion of bumper 12 affords a substanial degree of protection to radiator grille 11.

The novel method of making a vehicle bumper, such for example as the one illustrated in Figure 1, which is the subject of my patent application Serial No. 109,294 filed November 5, 1936, will now be described. The first step of the process is to form a U-shaped strip of material 18 such as that illustrated in Figure 2 of the drawing of some suitable bumper material (preferably steel). The U-shaped strip of material 18 includes a central or base portion 19 and two arm or leg portions 20 and 21.

The next step of the process involves a bending of the U-shaped strip of material 18 into a shape somewhat similar to the central portion of an inverted double cycloid as is illustrated in Figure 3 of the drawing. This step of the process is accomplished by bending of the U-shaped strip 18 along two diverging lines 22 and 23 located at the center of the base portion 19 of U-shaped strip 18. The position of the legs 20 and 21 before and after this bending operation is clearly indicated in Figure 3. It should be noted that after this bending operation, legs 20 and 21 remain in substantially the same plane as they were in prior to the bending operation.

The next step of the process involves bending down the extreme end portions 24 and 25 of legs 20 and 21 respectively as is indicated in Figure 3 of the drawing. This bending down of end portions 24 and 25 not only enhances the general appearance of the bumper but it also provides plates for connecting bumper supports to the bumper (not shown).

The final step of the process involves bending the outwardly extending arm or leg portions 20 and 21 rearwardly as is indicated in Figure 4 of the drawing. From the above description it will be seen that I have provided an extremely simple method for making vehicle bumpers of the type adapted to afford a substantial degree of protection to the radiator grille of an automotive vehicle. The process thus described is economical in manufacture, and the resulting article is rugged and reliable in use.

While I have described the particular embodiment of my invention, it will of course be understood that I do not wish to be limited thereto, since many modifications may be made, and I therefore contemplate by the appended claims to cover all such modifications as fall within the true spirit and scope of my invention.

I claim as my invention:

1. The method of making vehicle bumpers which includes forming a strip of bumper material stock into a substantially U-shaped strip, the plane of the U being substantially parallel to the face of the strip, and then bending each leg of the U-shaped strip to extend in opposite directions.

2. The method of making vehicle bumpers which includes forming a strip of bumper material stock into a substantially U-shaped strip, the plane of the U being substantially parallel with the face of the strip, and then bending each leg of the U-shaped strip to extend in opposite directions in substantially the original plane of the strip.

3. The method of making vehicle bumpers which includes forming a strip of bumper material stock into a substantially U-shaped strip, the plane of the U being substantially parallel with the face of the strip, and then bending each leg of the U-shaped strip at the base of the U to extend in opposite directions.

4. The method of making vehicle bumpers which includes forming a strip of bumper material stock into a substantially U-shaped strip, the plane of the U being substantially parallel with the face of the strip, and then bending said strip along two diverging lines disposed substantially 45° from the axis of the U.

5. The method of making vehicle bumpers which includes forming a strip of bumper material stock into a substantially U-shaped strip, the plane of the U being substantially parallel with the face of the strip, and then bending said strip along two lines on said strip which diverge from the extreme apex of the U.

6. The method of making vehicle bumpers which includes forming a strip of bumper material stock into a substantially U-shaped strip, the plane of the U being substantially parallel with the face of the strip, and then bending said strip along two lines on said strip which diverge from a common outer edge point on the base of the U.

7. The method of making vehicle bumpers which includes forming a substantially U-shaped strip of bumper material, and then bending said strip substantially at its center to form an article similar in shape to the central portion of an inverted double cycloid.

8. The method of making vehicle bumpers which includes forming a substantially U-shaped strip of bumper material, bending each leg of the strip at the center of the U to extend in opposite directions, and finally bending the extreme ends of the legs along the line disposed at substantially 45° to the direction of extension of the legs.

9. The method of making an impact member for a bumper which includes making two flat transverse mutually-perpendicular folds midway between the ends of a strip of bumper material to form a fender guard extension and an upwardly projecting central formation.

10. The method of making an impact member for a bumper which includes making two flat transverse mutually-perpendicular folds midway between the ends of a strip of U-shaped bumper material to form a fender guard extension and an upwardly projecting central formation, with a loop at its apex.

11. The method of making an article of manufacture comprising a combination vehicle bumper and guard from a single strip of metal which includes the steps of bending and folding an integral intermediate portion of the strip to form said portion into a reinforced projection extending a substantial distance above the normal upper horizontal level of the main body of the bumper to serve as a guard for a radiator and the like and forming the end portions of said single strip below said horizontal level for attachment to the vehicle and to resist turning of said projection when subjected to impact blows.

GEORGE ALBERT LYON.